US005747767A

United States Patent [19]

Severance et al.

[11] Patent Number: 5,747,767

[45] Date of Patent: May 5, 1998

[54] EXTENDED WATER-INJECTION NOZZLE ASSEMBLY WITH IMPROVED CENTERING

[75] Inventors: Wayne Stanley Severance, Darlington; Duane Norman Winterfeldt, Clio, both of S.C.

[73] Assignee: The ESAB Group, Inc., Florence, S.C.

[21] Appl. No.: 527,526

[22] Filed: Sep. 13, 1995

[51] Int. Cl.[6] .................................................... B23K 10/00

[52] U.S. Cl. .................................. 219/121.5; 219/121.51; 219/121.48; 219/75; 313/231.41

[58] Field of Search ........................... 219/121.5, 121.48, 219/121.39, 121.59, 121.51, 121.52, 74, 75; 313/231.41, 231.31

[56] References Cited

U.S. PATENT DOCUMENTS

| | | | |
|---|---|---|---|
| 4,430,546 | 2/1984 | Irons | 219/121.59 |
| 4,455,470 | 6/1984 | Klein et al. | 219/121.48 |
| 4,521,666 | 6/1985 | Severance, Jr. et al. | 219/121.5 |
| 4,782,210 | 11/1988 | Nelson et al. | 219/121.52 |
| 4,954,688 | 9/1990 | Winterfeldt . | |
| 4,992,642 | 2/1991 | Kamp et al. . | |
| 5,124,525 | 6/1992 | Severance, Jr. et al. . | |
| 5,304,770 | 4/1994 | Takabayashi . | |
| 5,414,237 | 5/1995 | Carkhuff | 219/121.7 |
| 5,451,739 | 9/1995 | Nemchinsky et al. | 219/121.5 |

FOREIGN PATENT DOCUMENTS

| | | |
|---|---|---|
| 44 07 913 | 10/1994 | Germany . |

*Primary Examiner*—Mark H. Paschall
*Attorney, Agent, or Firm*—Bell Seltzer Intellectual Property Law Group of Alston & Bird LLP

[57] ABSTRACT

A plasma arc torch is provided with an extended water-injection nozzle assembly characterized by the ability to produce a bevel cut or weld, and a cut or weld within a concavity on the top surface of a workpiece. The nozzle assembly includes a nozzle base, a swirl ring and an outer shell press-fit together to center and maintain the concentricity of the water-injection bore of the outer shell relative to the gas-constricting bore of the nozzle base. A radially exterior, frusto conical surface of the nozzle base and a radially interior, frusto conical surface of the outer shell define a fluid passageway therebetween for communicating a vortical flow of cooling fluid from an external source to the water-injection bore of the outer shell. Preferably, the vortical flow of cooling fluid further constricts the plasma arc extending outwardly from the electrode and along the longitudinal discharge axis defined by the plasma arc torch in the direction of the workpiece.

22 Claims, 3 Drawing Sheets

EXTENDED WATER-INJECTION NOZZLE ASSEMBLY WITH IMPROVED CENTERING

FIELD OF THE INVENTION

The invention relates to a water-injection nozzle assembly for a plasma arc torch including means for centering and maintaining the concentricity of the water-injection bore relative to the gas-constricting bore.

BACKGROUND OF THE INVENTION

A plasma arc torch is typically used for cutting or welding a metal workpiece positioned at a predetermined distance beneath the torch. The predetermined distance, the distance from the lower end of the nozzle to the top surface of the workpiece, is known as the stand-off distance. When cutting or welding flat workpieces normal to the top surface of the workpiece, the shape of the lower end of the nozzle has little or no effect on the quality and speed of the cut or weld. When cutting or welding a bevel, i.e. an angled surface relative to the top surface of the workpiece, or when cutting or welding a workpiece having sharp concavities in the top surface, however, the quality and speed of the cut or weld depends to a large degree on the shape of the lower end of the torch.

The lower end of the nozzle of a conventional plasma arc torch is generally short and has a relatively flat end face. The shape of the lower end of the nozzle, combined with the relatively large diameter of the nozzle retaining cup necessary to convey the cutting fluid to the plasma arc and to secure the nozzle on the electrode, restricts the ability of the nozzle to make a bevel cut or weld at angles greater than about 15 degrees with optimum standoff.

For a given workpiece, the best quality and speed of cut or weld is obtained at a particular predetermined stand-off distance. The predetermined stand-off distance is usually short, on the order of 0.375 inches, to convey the necessary cutting or welding energy to the workpiece. When attempting to cut or weld a bevel, however, the flat end face of the lower end of the nozzle and the large diameter of the lower nozzle member or the nozzle retaining cup prevents the torch from operating at the predetermined stand-off distance without contacting the surface of the workpiece. Accordingly, the stand-off distance must be increased and the quality and speed of the cut or weld is diminished.

For example, the model PT-15 plasma arc torch manufactured by The ESAB Group, Inc. of Florence, S.C., includes a nitrogen nozzle having a length to diameter ratio of 0.57. The diameter of the end face of the nozzle is about 0.80 inches and the length is measured between the end face of the nozzle and the lower edge of the nozzle retaining cup. When making a bevel cut or weld at 45 degrees, for example, the torch is inclined with respect to the workpiece and it is impossible to maintain a stand-off distance less than about 0.62 inches since the nozzle retaining cup will contact the top surface of the workpiece. Accordingly, the flatness of the nozzle is exaggerated by the size and position of the nozzle retaining cup.

Attempts have been made to provide an extended lower nozzle member that is longer and more pointed. U.S. Pat. No. 5,304,770 to Takabayashi discloses a plasma arc torch provided with a sharply converging nozzle to prevent the lower end of the torch from making contact with the top surface of the workpiece during a cutting or welding operation. The included angle of the nozzle structure is therefore smaller so that the exterior surface of the nozzle is more sharply tapered. The Takabayashi nozzle, however, is designed for low power operation without water-injection. Thus, the nozzle retaining cup, which does not convey cutting fluid to the plasma arc, is smaller and is positioned adjacent the upper portion of the nozzle and does not interfere with the sharply convergent shape of the nozzle.

U.S. Pat. No. 4,954,688 to Winterfeldt, and assigned to the present assignee, discloses a water-injection nozzle including a lower nozzle member that has an extended length. The discharge end of the lower nozzle member is angled sharply and defines a frusto conical exterior surface to permit the torch to be positioned closely adjacent the workpiece when making a bevel cut or weld. Thus, the torch is able to achieve the predetermined stand-off distance which maximizes the quality and speed of the cut or weld.

The Winterfeldt nozzle, however, cannot be manufactured easily, reliably, and economically with conventional water-injection nozzle designs. As the length of the nozzle increases, it becomes more difficult to maintain satisfactory concentricity between the water-injection bore and the gas-constricting bore of the nozzle. In addition, the water-injection bore of the Winterfeldt nozzle is positioned between the lower and upper nozzle members. Accordingly, the plasma arc is not subjected to the additional constriction available from an optimized water-injection nozzle having a bore adjacent the lower end of the nozzle.

SUMMARY OF THE INVENTION

In view of the noted deficiencies in the prior art, it is an object of the invention to provide a water-injection nozzle assembly for a plasma arc torch that is capable of producing a good quality bevel cut or weld on a workpiece.

It is another object of the invention to provide a water-injection nozzle assembly for a plasma arc torch that permits the nozzle of the torch to be positioned at a predetermined stand-off distance above the top surface of the workpiece.

It is another, and more particular, object of the invention to provide a water-injection nozzle assembly for a plasma arc torch with improved means for centering and maintaining the concentricity of the water-injection bore relative to the gas-constricting bore.

According to the invention, a plasma arc torch preferably including a torch body, an electrode, and a nozzle assembly retaining cup is provided with an extended water-injection nozzle assembly. The torch body defines a longitudinal discharge axis and preferably includes an electrode holder for securing the electrode on the discharge axis. The torch body further preferably includes a fluid inlet passageway for supplying a cooling fluid, preferably water, to the torch from an external source, and a gas inlet passageway for supplying a gas to form a plasma arc extending from the electrode and along the discharge axis. The water-injection nozzle assembly is preferably positioned adjacent the discharge end of the electrode and is preferably secured onto the torch body by the nozzle assembly retaining cup.

The water-injection nozzle assembly of the invention is characterized by the ability to produce bevel cuts and welds, and cuts and welds within a concavity, at a relatively short, predetermined stand-off distance from a workpiece while maintaining the concentricity of the water-injection bore relative to the gas-constricting bore. The nozzle assembly includes a nozzle base, an annular swirl ring, and an outer shell press fit together to center and maintain the concentricity of the water-injection bore relative to the gas-constricting bore.

The nozzle base preferably includes a cylindrical upper portion positioned around the electrode of the torch and a frusto conical lower portion adjacent the discharge end of the electrode. The frusto conical lower portion of the nozzle base defines a sharply convergent, frusto conical exterior surface and a sharply convergent, frusto conical interior surface terminating at the gas constricting bore. The gas-constricting bore through the nozzle base is coaxially aligned with the longitudinal discharge axis defined by the torch body.

The annular swirl ring is press-fit onto the exterior surface of the cylindrical upper portion of the nozzle base. The swirl ring has at least one opening therethrough for communicating the cooling fluid from the fluid inlet passageway to the frusto conical lower portion of the nozzle base. Preferably, the swirl ring has a Z-shaped cross-section such that the radially interior surface of the swirl ring is in press-fit engagement with the nozzle base while the radially exterior surface is in press-fit engagement with the outer shell.

The outer shell of the nozzle assembly preferably includes a cylindrical upper portion press-fit onto the cylindrical upper portion of the nozzle base, and a frusto conical lower portion positioned adjacent the frusto conical lower portion of the nozzle base. The frusto conical lower portion of the outer shell defines a sharply convergent interior surface terminating at the water-injection bore. The water-constricting bore through the outer shell is coaxially aligned with the longitudinal discharge axis defined by the torch body.

Together, the exterior surface of the lower portion of the nozzle base and the interior surface of the lower portion of the outer shell define a fluid passageway for communicating the cooling fluid from the fluid inlet passageway to the water-injection bore. The fluid entering the water-injection bore of the outer shell preferably further constricts the plasma arc exiting the gas-constricting bore of the nozzle base such that a well defined plasma arc extends outwardly from the electrode of the torch in the direction of the workpiece.

Preferably, the angle formed between the fluid passageway and the longitudinal discharge axis defined by the torch body is less than about 60 degrees, and preferably less than about 45 degrees. The distance between the lower edge of the nozzle assembly retaining cup and the lower end of the nozzle assembly is greater than about 0.9 inches. Accordingly, the plasma arc torch provided with the extended water-injection nozzle assembly of the invention is able to produce bevel cuts and welds, and cuts and welds within a concavity, while maintaining a predetermined stand-off distance from the workpiece.

BRIEF DESCRIPTION OF DRAWINGS

Having set forth some of the objects and advantages of the invention, other objects and advantages will appear as the description of the invention proceeds in conjunction with the following drawings in which.

DETAILED DESCRIPTION OF THE PREFERRED EMBODIMENTS

Figure 1:
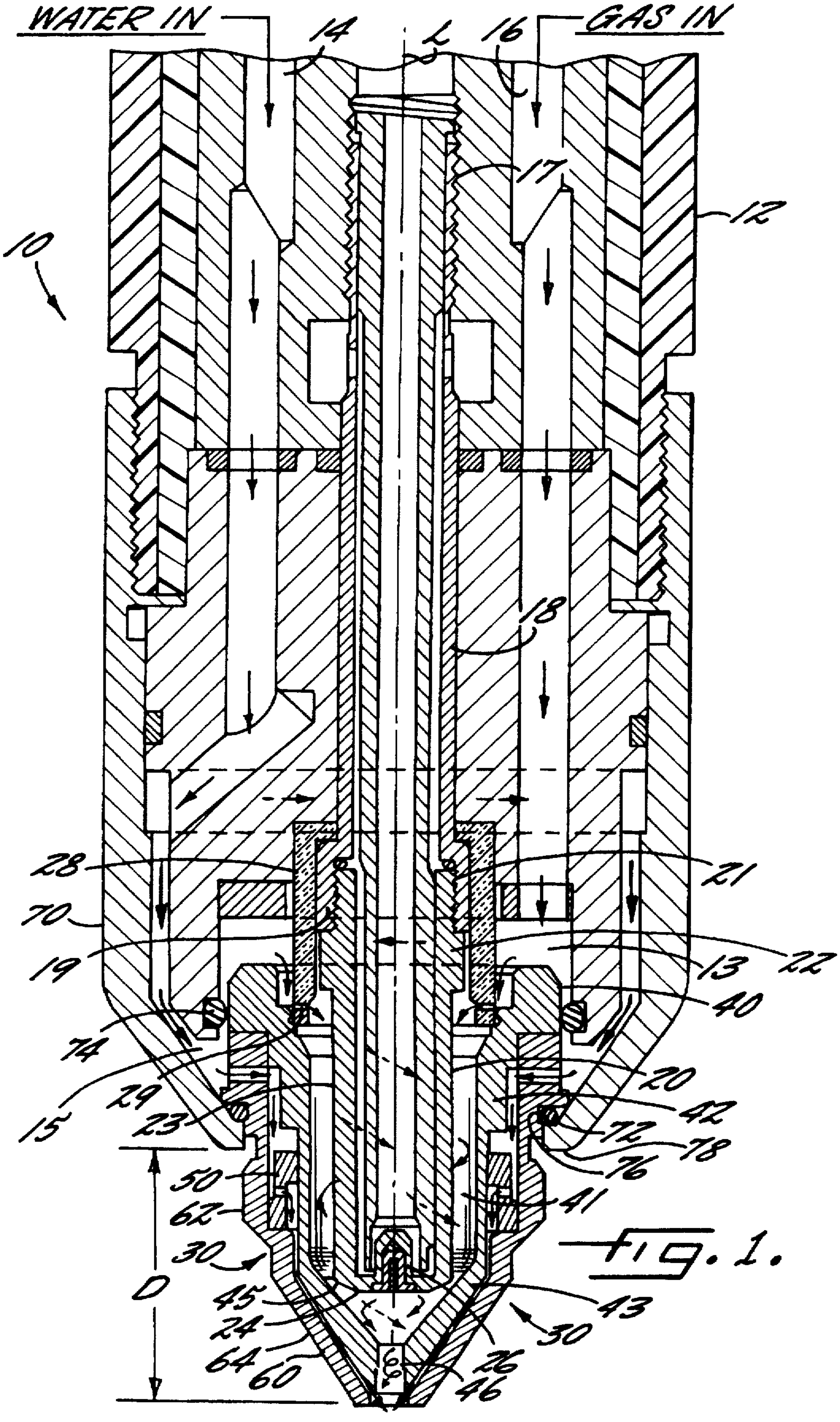
FIG. 1 is a sectional elevation view of a plasma arc torch including a water-injection nozzle according to the invention.

Referring to the accompanying drawings, FIG. 1 illustrates a preferred embodiment of a plasma arc torch, indicated generally at 10, including a water-injection nozzle assembly, indicated generally at 30, according to the invention. The torch 10 comprises a torch body 12, an electrode 20, the nozzle assembly 30 and a nozzle assembly retaining cup 70.

The torch body 12 is generally cylindrical, elongate and defines a longitudinal discharge axis L. At its lower end, torch body 12 has a cylindrical cavity 13 therein for housing electrode 20 and nozzle assembly 30. Torch body 12 includes an electrode holder 18, a fluid inlet passageway 14 and a gas inlet passageway 16. Electrode holder 18 is generally cylindrical, elongate and is disposed within cavity 13 of torch body 12 and coaxially along the longitudinal discharge axis L. At its upper end, electrode holder 18 comprises an externally threaded portion 17 for engaging internal threads provided on torch body 12 to secure the electrode holder to the torch body.

At its lower end, electrode holder 18 preferably comprises an internally threaded lower portion 19 for securing the electrode 20 on the torch body 12. Preferably, electrode 20 comprises an externally threaded portion 21 adjacent upper end 22 for engaging the internally threaded lower portion 19 of electrode holder 18. In other preferred embodiments, however, electrode 20 may be secured to electrode holder 18 in any manner that permits the electrode to be readily removed for replacement, for example by interference-fit, and ensures that the electrode is in good electrical contact with a conductor from an external power source (not shown). Nevertheless, electrode 20 is secured to the torch body 12 adjacent lower portion 19 of electrode holder 18 and coaxially along longitudinal discharge axis L.

Electrode 20 is electrically conductive and comprises a generally cylindrical, elongate body 23 having a lower, or discharge, end 24. Preferably, discharge end 24 comprises an emissive insert 26 which acts as the cathode terminal for an electrical arc extending from the discharge end of the electrode 20 and along the longitudinal discharge axis L in the direction of a workpiece (not shown) positioned beneath the torch 10. An electrode comprising an emissive insert is disclosed in U.S. Pat. No. 5,023,425 to Severance, Jr., and assigned to the assignee of the present invention, the disclosure of which is incorporated herein by reference.

Emissive insert 26 is composed of a material which has a relatively low work function, defined in the art as the potential step, measured in electron volts, that permits thermionic emission from the surface of a metal at a given temperature. In view of its low work function, emissive insert 26 readily emits electrons in the presence of an electric potential. Commonly used materials for fabricating inserts include hafnium, zirconium, tungsten, and alloys thereof.

A gas baffle 28 is preferably positioned adjacent the upper end 22 of electrode 20 and the lower portion 19 of electrode holder 18. Gas baffle 28 has at least one, and preferably a plurality of radially inwardly directed, circumferentially-spaced holes 29 therein that direct gas from gas inlet passageway 16 around the periphery of the body 23 of electrode 20. As indicated by the arrows, gas from an external source (not shown) flows through gas inlet passageway 16 into an annular chamber in cavity 13 between gas baffle 28 and torch body 12. The pressurized gas encircles gas baffle 28 and is forced through holes 29 into a cylindrical chamber between electrode 20 and nozzle assembly 30 to form a swirling vortex flow of gas. The swirling flow of gas ionizes the electrical arc extending from discharge end 24 of electrode 20 to create a plasma arc extending in the direction of the workpiece.

Figure 2:
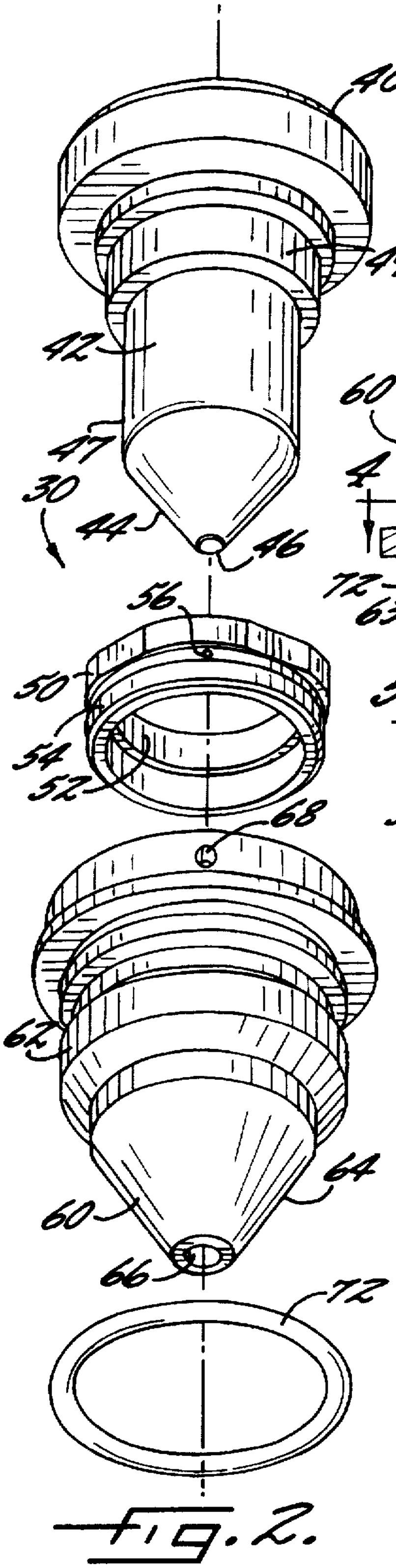
FIG. 2 is an exploded perspective view of the water-injection nozzle assembly of the torch of FIG. 1.

Water-injection nozzle assembly 30 is positioned adjacent electrode 20 and coaxially along longitudinal discharge axis L of torch body 12. Nozzle assembly 30 comprises a nozzle base 40, an annular swirl ring 50 and an outer shell 60 press-fit together for a purpose to be described hereafter. As illustrated in exploded perspective view FIG. 2, swirl ring 50 is positioned over nozzle base 40 and outer shell 60 is positioned in turn over swirl ring 50. O-ring 72 is positioned over outer shell 60 for accepting nozzle assembly retaining cup 70 as will be described.

Figure 3:
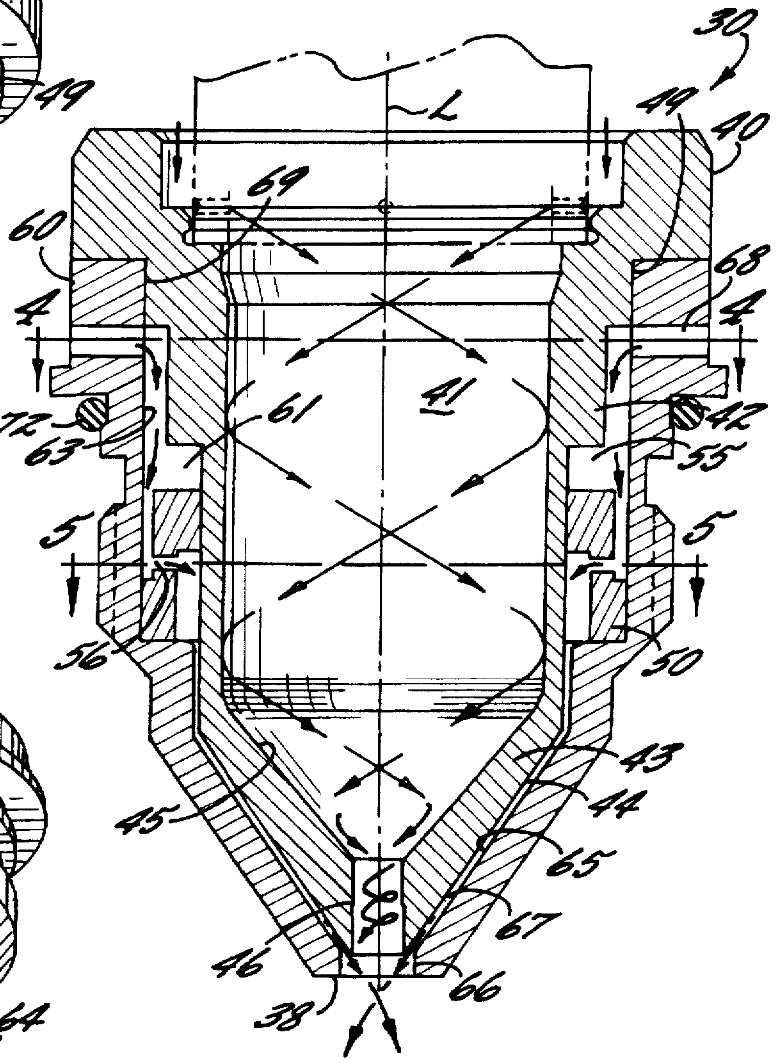
FIG. 3 is a sectional elevation view of the water-injection nozzle assembly of the torch of FIG. 1.

As best shown in the sectional elevation view FIG. 3, nozzle base 40 has a cavity 41 formed therein and comprises a generally cylindrical upper portion 42 and a frusto conical lower portion 43. The lower portion 43 defines a sharply convergent, frusto conical exterior surface 44 and a sharply convergent, frusto conical interior surface 45 terminating at a gas-constricting bore 46 through the nozzle base 40 and coaxially aligned with longitudinal discharge axis L of torch body 12. As indicated by the arrows, interior surface 45 directs the swirling vortex flow of gas in cavity 41 into gas-constricting bore 46 to constrict the plasma arc in the direction of the workpiece.

Annular swirl ring 50 is press-fit onto the exterior surface 47 of cylindrical upper portion 42 of nozzle base 40. In the preferred embodiment shown, swirl ring 50 has a Z-shaped cross section defining a radially interior, cylindrical surface 52 and a radially exterior, cylindrical surface 54. Surface 52 is in press-fit engagement with radially exterior, cylindrical surface 47 of nozzle base 40 and surface 54 is in press-fit engagement with radially interior, cylindrical surface 63 of outer shell 60 such that swirl ring 50 is coaxially aligned with longitudinal discharge axis L of torch body 12. Swirl ring so has at least one, and preferably a plurality of tangentially-directed, circumferentially-spaced holes 56 therein for communicating cooling fluid from fluid inlet passageway 14 to lower portion 44 of nozzle base 40.

Outer shell 60 has a cavity 61 formed therein and comprises a generally cylindrical upper portion 62 and a frusto conical lower portion 64. Lower portion 64 defines a sharply convergent, frusto conical interior surface 65 terminating at a water-injection bore 66 through the outer shell 60 and coaxially aligned with longitudinal discharge axis L of torch body 12. Surface 65 together with the radially exterior surface of lower portion 44 of nozzle base 40 define a fluid passageway 67 for communicating the cooling fluid from fluid inlet passageway 14 to the water-injection bore 66.

Outer shell 60 is press-fit onto swirl ring 50 as described above and upper portions of the outer shell 60 and nozzle base 40 are press-fit together at a location axially spaced from the swirl ring. This latter press-fit comprises a radially interior, cylindrical surface 69 of outer shell 60 which is in press-fit engagement with a radially exterior, cylindrical surface 49 of nozzle base 40. These two axially spaced apart press-fits insure that the outer shell 60 is coaxially aligned with longitudinal discharge axis L of torch body 12. Water-injection nozzle assembly 30 is then positioned within cavity 13 (FIG. 1) of torch body 12 against O-ring 74 and over electrode 20. Thereafter, nozzle assembly retaining cup 70 is secured onto torch body 12 such that nozzle assembly 30 is held firmly between the lower edge of gas baffle 28 and shoulder 76 on nozzle assembly retaining cup 70 against O-ring 72.

Figure 4:
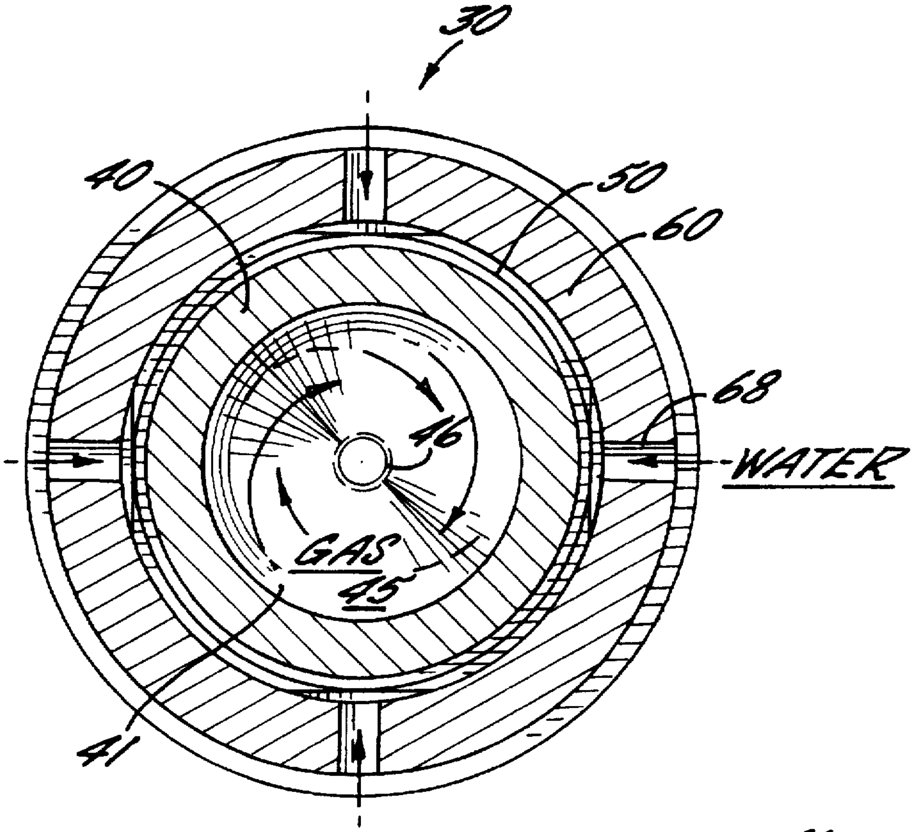
FIG. 4 is a cross-sectional view of the water-injection nozzle assembly taken along line 4—4 of FIG. 3.
Figure 5:
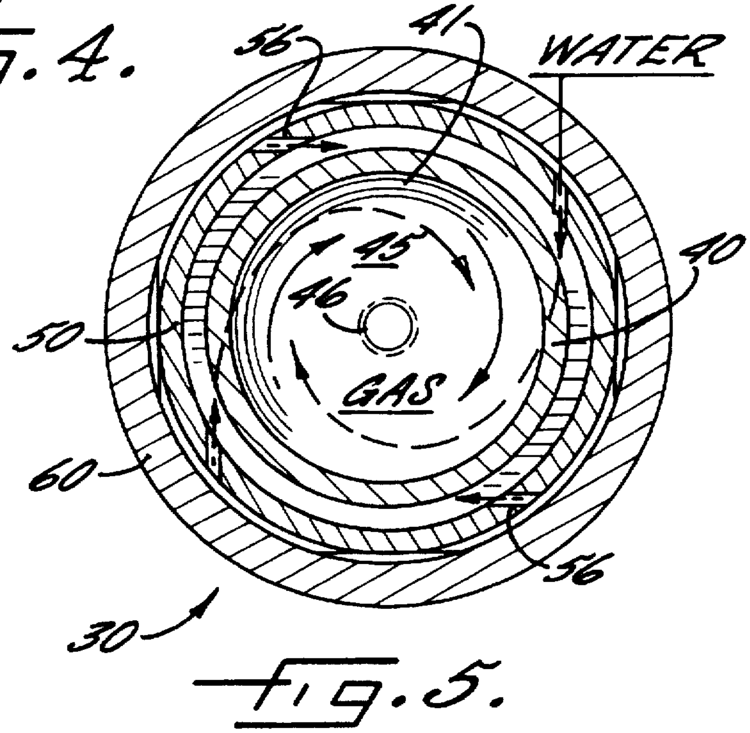
FIG. 5 is a cross-sectional view of the water-injection nozzle assembly taken along line 5—5 of FIG. 3.

O-ring 72 and O-ring 74 seal the fluid inlet passageway 14 and the gas inlet passageway 16, respectively. As indicated by the arrows in FIGS. 3–5, the cooling fluid, preferably water from an external source (not shown) flows through fluid inlet passageway 14 into an annular chamber 15 (FIG. 1) between nozzle assembly 30 and nozzle assembly retaining cup 70. The cooling fluid is directed through at least one, and preferably a plurality of radially extending, circumferentially-spaced holes 68 in outer shell 60 and into a cylindrical chamber 55 (FIG. 3) between nozzle base 40 and outer shell 60 above swirl ring 50. The cooling fluid passes through holes 56 in swirl ring 50 into fluid passageway 67 to form a swirling vortex flow of fluid in water-injection bore 66. It is believed that the swirling vortex of cooling fluid further constricts the plasma arc exiting the gas-constricting bore 46 in the direction of the workpiece.

The angles formed between the surfaces 64, 65, and 44 and longitudinal discharge axis L defined by torch body 12 are equal, and are less than about 60 degrees, and preferably less than about 45 degrees. In one specific embodiment, the angles are about 34 degrees, which permits the frusto conical portions of the nozzle base 40 and the outer shell 60 to have a significant longitudinal extent. The distance D (FIG. 1) between the lower edge 78 of nozzle assembly retaining cup 70 and the lower end 38 of the extended water-injection nozzle assembly 30 is thus sufficient to permit the torch 10 to produce a bevel cut or weld, and a cut or weld within a sharp concavity on the top surface of the workpiece at a relatively short, predetermined stand-off distance. Typically, the distance D is on the order of 0.9 inches while the predetermined stand-off distance to produce the best quality and speed of cut or weld is typically on the order of 0.375 inches.

Accordingly, a plasma arc torch provided with the extended water-injection nozzle assembly 30 of the invention has the ability to produce a bevel cut or weld, and a cut or weld within a sharp concavity on the top surface of the workpiece, at a relatively short stand-off distance while centering and maintaining the concentricity of the water-injection bore relative to the gas-constricting bore. Obviously, many alternative embodiments of the invention are within the ordinary skill of those skilled in the art. Therefore, it is not intended that the invention be limited to the preceding description of illustrative preferred embodiments, but rather that all embodiments within the spirit and scope of the invention disclosed and claimed herein be included.

That which is claimed is:

1. A plasma arc torch characterized by the ability to produce a bevel cut or weld and a cut or weld within a concavity on the top surface of a workpiece while maintaining a relatively short standoff distance from the workpiece, said torch comprising a torch body defining a longitudinal discharge axis, an electrode secured to said torch body, said electrode comprising a discharge end, a gas-constricting and water-injection nozzle assembly mounted adjacent said discharge end of said electrode, said nozzle assembly comprising a nozzle base having a bore therethrough coaxially aligned with the longitudinal discharge axis defined by said torch body, an outer shell positioned radially outwardly of said nozzle base and having a bore therethrough coaxially aligned with the longitudinal discharge axis defined by said torch body and having at least one opening therethrough, said outer shell being positioned to define a fluid passageway between said nozzle base and said outer shell terminating at the bore thereof, and an annular swirl ring positioned between said nozzle base and said outer shell, said swirl ring having at least one opening therethrough, means for generating an electrical arc extending from said discharge end of said electrode, means for supplying a flow of a gas from an external source to create a vortical flow of gas adjacent said discharge end of said electrode to generate a plasma flow extending along the longitudinal discharge axis, through the bore in said nozzle base and through the bore in said outer shell, and means for supplying a flow of fluid from an external source through said at least one opening in said outer shell, through said at least one opening in said swirl ring, and through said fluid passageway to create a vortical flow of fluid to constrict said plasma flow extending along the longitudinal discharge axis defined by said torch body, and wherein said swirl ring is press-fit onto said nozzle base and said outer shell is press-fit onto said swirl ring to center and maintain the concentricity of the bore in said outer shell relative to the bore in said nozzle base.

2. A plasma arc torch according to claim 1 wherein said nozzle base includes a radially exterior cylindrical surface and said swirl ring includes a radially interior cylindrical surface which is press fit onto said radially exterior cylindrical surface of said nozzle base, and wherein said swirl ring includes a radially exterior cylindrical surface and said outer shell includes a radially interior cylindrical surface which is press fit onto said radially exterior cylindrical surface of said swirl ring.

3. A plasma arc torch according to claim 2 wherein said nozzle base includes an upper portion which is axially spaced from said swirl ring and which includes a radially exterior cylindrical surface, and wherein said outer shell includes an upper portion having a radially interior cylindrical surface which is mounted in close fitting relation onto said radially exterior cylindrical surface of said upper portion of said nozzle base.

4. A plasma arc torch according to claim 3 wherein said radially interior cylindrical surface of said upper portion of said outer shell is press fit onto said radially exterior cylindrical surface of said upper portion of said nozzle base.

5. A plasma arc torch according to claim 3 wherein said electrode further comprises an upper end opposite said discharge end and wherein said means for creating a vortical flow of a gas comprises a gas baffle having an outlet port adjacent said upper end of said electrode such that the vortical flow of gas encircles substantially the entire length of said electrode between said upper end and said discharge end.

6. A plasma arc torch according to claim 5 wherein said electrode is relatively long and is disposed substantially within said nozzle base and said outer shell.

7. A plasma arc torch according to claim 5 wherein the angle between said fluid passageway and the longitudinal discharge axis is less than about 60 degrees.

8. A plasma arc torch according to claim 2 wherein said opening means includes radial openings in said swirl ring which are tangentially oriented with respect to said central axis so as to impart a swirling path to the water passing therethrough, and wherein said interior cylindrical surface and said exterior cylindrical surface of said swirl ring are axially spaced apart, and wherein said radial openings in said swirl ring are disposed axially between said interior cylindrical surface and said exterior cylindrical surface of said swirl ring.

9. A plasma arc torch according to claim 1 wherein said swirl ring has a Z-shaped cross section and comprises a circumferentially continuous radially interior surface cooperating with a circumferentially continuous radially exterior surface of said nozzle base in press-fit engagement, and a circumferentially continuous radially exterior surface cooperating with a circumferentially continuous radially interior surface of said outer shell in press-fit engagement.

10. A plasma arc torch according to claim 1 further comprising a nozzle assembly retaining cup secured to said torch body, said nozzle assembly retaining cup comprising means for engaging said nozzle assembly to retain said nozzle assembly in longitudinal relation to said electrode and coaxially aligned with the longitudinal discharge axis defined by said torch body.

11. A plasma arc torch according to claim 10 wherein said outer shell further comprises an upper portion and a lower portion, said upper portion comprising a radially outwardly extending flange defining a shoulder for receiving said engaging means of said nozzle assembly retaining cup.

12. A plasma arc torch according to claim 11 wherein said engaging means of said nozzle assembly retaining cup comprises a radially inwardly extending flange for engaging said radially outwardly extending flange of said outer shell.

13. The nozzle assembly according to claim 22 wherein said interior cylindrical surface and said exterior cylindrical surface of said swirl ring are axially spaced apart, and wherein said radial openings in said swirl ring are disposed axially between said interior cylindrical surface and said exterior cylindrical surface of said swirl ring.

14. A nozzle assembly for a plasma arc torch defining a longitudinal discharge axis, said nozzle assembly comprising a nozzle base having a bore therethrough coaxially aligned with the longitudinal discharge axis defined by said torch, an annular swirl ring press-fit onto a radially exterior surface of said nozzle base, said swirl ring having at least one opening therethrough, and an outer shell press-fit onto a radially exterior surface of said swirl ring, said outer shell having a bore therethrough coaxially aligned with the longitudinal discharge axis defined by said torch and having at least one opening therethrough, at least a portion of a radially exterior surface of said nozzle base and at least a portion of a radially interior surface of said outer shell defining a fluid passageway therebetween for communicating a flow of fluid from the at least one opening in said outer shell, through the at least one opening in said swirl ring and into said fluid passageway to create a vortical flow of fluid adjacent the bore in said outer shell, and wherein said nozzle base, said swirl ring and said outer shell are press-fit together to center and maintain the concentricity of the bore in said nozzle base relative to the bore in said outer shell.

15. A nozzle assembly according to claim 14 wherein the angle between said fluid passageway and the longitudinal discharge axis defined by said torch is less than about 60 degrees.

16. A nozzle assembly according to claim 14 wherein said swirl ring has a Z-shaped cross section and comprises a circumferentially continuous radially interior surface cooperating with a circumferentially continuous radially exterior surface of said nozzle base in press-fit engagement, and a circumferentially continuous radially exterior surface cooperating with a circumferentially continuous radially interior surface of said outer shell in press-fit engagement.

17. A nozzle assembly for a plasma arc torch comprising a nozzle base having a bore therethrough which defines a central axis, and comprising (a) a lower portion having a frusto conical exterior surface, (b) a medial portion having a cylindrical exterior surface, and (c) an upper portion having a cylindrical exterior surface;

an annular swirl ring coaxially mounted on said medial portion of said nozzle base and having an interior cylindrical surface which is mounted upon said cylindrical surface of said medial portion of said nozzle base, and an exterior cylindrical surface;

an outer shell coaxially mounted on said swirl ring and said nozzle base, and comprising (a) a lower portion having a frusto conical interior surface which overlies said frusto conical lower portion of said nozzle base in spaced relation so as to define a frusto conical passage therebetween, (b) a medial portion having a cylindrical interior surface which is mounted upon said cylindrical exterior surface of said swirl ring, and (c) an upper portion having a cylindrical interior surface which is mounted upon said cylindrical exterior surface of said upper portion of said nozzle base; and opening means defining a water passageway extending radially through said outer shell at a location above said swirl ring, axially between said medial portions of said nozzle base and said outer shell, through said swirl ring, and to said frusto conical passage for introducing water into said frusto conical passage.

18. The nozzle assembly as defined in claim 17 wherein said frusto conical exterior surface of said lower portion of said nozzle base and said frusto conical interior surface of said lower portion of said outer shell each form an angle less than about 60 degrees with respect to said central axis.

19. The nozzle assemble as defined in claim 18 wherein said lower portion of said outer shell further includes a frusto conical exterior surface which forms an angle less than about 60 degrees with respect to said central axis.

20. The nozzle assembly as defined in claim 19 wherein the angles formed between each of (1) said frusto conical surface of said lower portion of said nozzle base, (2) said frusto conical interior surface of said lower portion of said outer shell, and (3) said frusto conical exterior surface of said lower portion of said outer shell, and said central axis, are substantially equal.

21. The nozzle assembly as defined in claim 18 wherein said opening means includes radial openings in said swirl ring which are tangentially oriented with respect to said central axis so as to impart a swirling path to the water passing therethrough.

22. The nozzle assembly according to claim 21 wherein said cylindrical exterior surface of said medial portion of said nozzle base, said interior cylindrical surface of said swirl ring, said exterior cylindrical surface of said swirl ring, and said cylindrical interior surface of said medial portion of said outer shell are all circumferentially continuous.

* * * * *